Patented Aug. 9, 1938

2,126,620

UNITED STATES PATENT OFFICE 2,126,620

VULCANIZATION OF RUBBER

Albert M. Clifford, Stow, Ohio, assignor to Wingfoot Corporation, Wilmington, Del., a corporation of Delaware No Drawing. Application April 19, 1934, Serial No. 721,312

14 Claims. (Cl. 18—53)

This invention resides in the discovery that the dialicyclic alkylene diamines, compounds new in and of themselves, are excellent accelerators of the vulcanization of rubber. They may be represented by the formula R—NH—X—NH—R$_1$ in which X is an aliphatic group and R and R$_1$ are alicyclic radicals. Dicyclohexyl ethylene diamine, having the formula

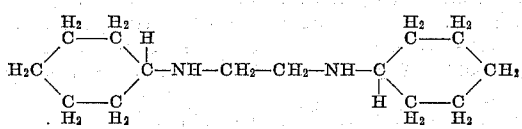

constitutes a specific example of one compound of this class which has been found to be a very efficient accelerator. Like the other members of the class, it constitutes a new chemical compound.

These dialicyclic alkylene diamines may be conveniently prepared by mixing the proper proportions of alicyclic primary amine and alkylene dihalide and either allowing the mixture to stand for several days or heating it either at atmospheric or superatmospheric pressure. Generally, however, heating the mixture above 100° C. will give the most efficient results. Several methods of preparation of dicyclohexyl ethylene diamine will be described, it being understood that these methods are but illustrative of the preparation of the members of the class of dialicyclic alkylene diamines.

Example 1

A mixture of 396 grams of cyclohexyl amine and 99 grams of ethylene dichloride is allowed to stand for a period of five days. After the first seven hours of standing, white crystals begin to form. Upon completion of the five day period, these crystals are filtered off and are obtained in a yield of about 107 grams. They melt at 203–205 degrees C. and are believed to be the hydrochloride of cyclohexyl amine. The filtrate is then subjected to distillation at a temperature of 120 degrees C. in order to separate any unreacted ethylene dichloride, after which the residue is treated with sodium hydroxide or other alkali. The free base is then extracted with ether and distilled. The product, anhydrous dicyclohexyl ethylene diamine, is obtained in the form of an oil boiling at 136–147 degrees C. at a pressure of 2 mm. The reaction may be represented as follows:

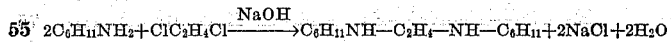

Example 2

A mixture of 150 grams of cyclohexyl amine, 74.3 grams of ethylene dichloride and 123 grams of sodium acetate (204.3 grams CH$_3$COONa.3H$_2$O) is heated in an autoclave for several hours at temperatures ranging up to 160 degrees C. Upon treatment of the product with a dilute solution of sodium hydroxide in water, a white crystalline material is obtained which, upon recrystallization from benzene, melts at 96–98 degrees C. This product is believed to be the monohydrate of dicyclohexyl ethylene diamine.

Example 3

A mixture of 326.7 grams of cyclohexyl amine, 148.5 grams of ethylene dichloride and 500 cc. of ethyl alcohol is refluxed for a period of four hours. A titration test made at the end of this period of time indicates that a yield of approximately 38.5% dicyclohexyl ethylene diamine is present. Upon continuing the refluxing for a period of an additional 16 hours, a titration test indicates 68.7% yield. After 14 hours more, a yield of 80.5% dicyclohexyl ethylene diamine is obtained.

Example 4

A mixture of 600 grams of cyclohexyl amine, 300 grams of ethylene dichloride, 240 grams of sodium hydroxide and 975 cc. of water is heated in a steam jacketed autoclave at a temperature of 135–140 degrees C. for a period of 2¾ hours. Upon cooling, a solid, dicyclohexyl ethylene diamine hydrate, separates out, which upon being filtered, washed and dried, is obtained in a yield of 459 grams. The melting point of the product is 87–91 degrees C.

Example 5

A mixture of 169.5 grams of o-methyl cyclohexyl amine, 81.5 grams of ethylene dichloride, 67.2 grams of 49% sodium hydroxide and 100 cc. of water are heated in an autoclave at temperatures of 120–140 degrees C. for a period of two hours. The product is treated with more sodium hydroxide and extracted with chloroform, after which the extract is dried with anhydrous sodium sulphate. A small amount of a salt which is present, believed to be di-(o-methyl cyclohexyl) piperazine, is filtered off and the remaining product fractionally distilled. A light brown liquid boiling at 210 degrees C. at a pressure of 35 mm. and identified as di-(o-methyl cyclohexyl) ethylene diamine, is obtained in a yield of approximately 45%. The equation representing the reaction is believed to be as follows:

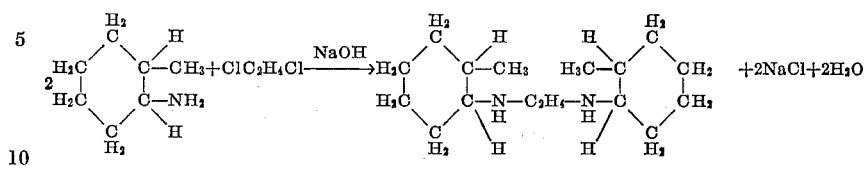

It will be understood that in place of cyclohexyl amine, any other alicyclic amine may be employed. Examples are ortho methyl cyclohexyl amine, cyclopentyl amine, cycloheptyl amine, para methyl cyclohexyl amine, hexahydro xylidine, hexahydro ortho phenetidine, hexahydro para phenetidine, hexahydro para anisidine, para dimethyl amino cyclohexyl amine, decahydro alpha naphthylamine, decahydro beta naphthylamine, etc. Similarly, in place of ethylene dichloride, other alkylene dihalides such as methylene dichloride, propylene dichloride, butylene dichloride, and 1-2-dichlor propane may be used. Instead of the dichlorides other dihalides such as the dibromides may, of course, be employed.

These dialicyclic alkylene diamines are strong bases and readily absorb water and carbon dioxide to form hydrates and carbamates. Carbon disulphide likewise combines to form dithiocarbamates. These materials are generally crystalline substances and in some cases are preferred to the original amine because of the greater ease with which they may be handled. Like the dialicyclic alkylene diamines themselves, these compounds may be employed as accelerators of vulcanization in substantially any of the ordinary rubber compounds. The following is a specific example of a formula found to yield excellent results:

| | Parts by weight |
|---|---|
| Extracted pale crepe rubber | 100 |
| Zinc oxide | 5 |
| Sulphur | 3 |
| Stearic acid | 1.5 |
| Accelerator | .5 |

In order to test the efficiency of the amines of this invention, representative compounds have been incorporated in samples of rubber prepared in accordance with the preceding formula. The samples were subjected to vulcanization for varying periods of time. The results of the tests are as follows:

| Cure | | Stress kgs./cm.² at— | | | Elongation in percent at break |
|---|---|---|---|---|---|
| Time in mins. | Temp. °F. | 500% elong. | 700% elong. | Break | |
| *Dicyclohexyl ethylene diamine hydrate* | | | | | |
| 20 | 260 | 4 | 6 | 27 | 960 |
| 40 | 260 | 8 | 17 | 70 | 920 |
| 80 | 260 | 16 | 46 | 110 | 855 |
| 60 | 285 | 41 | 160 | 187 | 725 |
| *Dicyclohexyl ethylene diamine carbamate* | | | | | |
| 40 | 260 | 9 | 19 | 63 | 940 |
| 80 | 260 | 10 | 24 | 88 | 950 |
| 60 | 285 | 17 | 49 | 135 | 880 |
| *Di- (o-methyl cyclohexyl) ethylene diamine* | | | | | |
| 40 | 260 | 7 | 14 | 45 | 920 |
| 60 | 260 | 10 | 25 | 59 | 860 |
| 80 | 260 | 12 | 36 | 87 | 850 |

From these data, it is apparent that the compounds of this invention are excellent vulcanization accelerators, producing adequate cures within comparatively short periods of time. Rubber compounds identical with those above described, but containing no accelerator, are either unvulcanized or only partially vulcanized under such conditions.

Although only the preferred form of the invention has been described in detail, it will be apparent to those skilled in the art that the invention is not limited thereto but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A method of treating rubber which comprises subjecting it to vulcanization in the presence of a material having the formula R—NH—X—NH—$R_1$, wherein X is an aliphatic hydrocarbon group and R and $R_1$ are alicyclic groups.

2. A method of treating rubber which comprises subjecting it to vulcanization in the presence of a material having the formula R—NH—X—NH—$R_1$, wherein X is an aliphatic hydrocarbon group and R and $R_1$ are cyclohexyl groups.

3. A method of treating rubber which comprises subjecting it to vulcanization in the presence of a material having the formula R—NH—X—NH—$R_1$, wherein X is an alkylene group and R and $R_1$ are alicyclic groups.

4. A method of treating rubber which comprises subjecting it to vulcanization in the presence of a material having the formula R—NH—X—NH—$R_1$, wherein X is an ethylene group and R and $R_1$ are alicyclic groups.

5. A method of treating rubber which comprises subjecting it to vulcanization in the presence of a material having the formula R—NH—X—NH—$R_1$, wherein X is an ethylene group, R is a cyclohexyl radical and $R_1$ is a cyclohexyl radical.

6. A rubber product that has been vulcanized in the presence of a material having the formula R—NH—X—NH—$R_1$, wherein X is an aliphatic hydrocarbon residue and R and $R_1$ are alicyclic groups.

7. A rubber product that has been vulcanized in the presence of a material having the formula R—NH—X—NH—$R_1$, wherein X is an aliphatic hydrocarbon residue and R and $R_1$ are cyclohexyl groups.

8. A rubber product that has been vulcanized in the presence of a material having the formula R—NH—X—NH—$R_1$, wherein X is an ethylene hydrocarbon residue, R is a cyclohexyl radical and $R_1$ is a cyclohexyl radical.

9. A rubber product that has been vulcanized in the presence of a material having the formula R—NH—X—NH—$R_1$, wherein X is an ethylene hydrocarbon residue and R and R₁ are alicyclic groups.

10. Symmetrical dicyclohexyl ethylene diamine.

11. The compounds having the formula R—NH—X—NH—R₁, wherein X is an aliphatic hydrocarbon group and R and R₁ are alicyclic groups.

12. The compounds having the formula R—NH—X—NH—R₁, wherein X is an alkylene group, R is a cyclohexyl radical and R₁ is a cyclohexyl radical.

13. A method of treating rubber which comprises subjecting it to vulcanization in the presence of a material selected from the class consisting of the symmetrical dialicyclic alkylene diamines, the symmetrical dialicyclic alkylene diamine hydrates, and the symmetrical dialicyclic alkylene diamine carbamates.

14. The compounds selected from the class consisting of the symmetrical dialicyclic alkylene diamines, the symmetrical dialicyclic alkylene damine hydrates, and the symmetrical dialicyclic alkylene diamine carbamates.

ALBERT M. CLIFFORD.